(12) United States Patent
Rattner et al.

(10) Patent No.: US 11,334,901 B2
(45) Date of Patent: May 17, 2022

(54) ARTIFICIAL INTELLIGENCE GENERATION OF AN ITEMIZED PROPERTY AND RENTERS INSURANCE INVENTORY LIST FOR COMMUNICATION TO A PROPERTY AND RENTERS INSURANCE COMPANY

(71) Applicant: Yembo, Inc., San Diego, CA (US)

(72) Inventors: Zachary Rattner, San Diego, CA (US); Siddharth Mohan, San Diego, CA (US)

(73) Assignee: YEMBO, INC., San Diego, CA (US)

( * ) Notice: Subject to any disclaimer, the term of this patent is extended or adjusted under 35 U.S.C. 154(b) by 80 days.

(21) Appl. No.: 16/730,491

(22) Filed: Dec. 30, 2019

(65) Prior Publication Data

US 2020/0151749 A1 May 14, 2020

Related U.S. Application Data

(63) Continuation of application No. 15/494,423, filed on Apr. 21, 2017, now Pat. No. 10,528,962.
(Continued)

(51) Int. Cl.
*G06Q 30/02* (2012.01)
*G06N 20/00* (2019.01)
(Continued)

(52) U.S. Cl.
CPC ........ *G06Q 30/0206* (2013.01); *G06N 20/00* (2019.01); *G06Q 30/0283* (2013.01); *G06Q 30/0611* (2013.01); *G06N 3/08* (2013.01)

(58) Field of Classification Search
CPC .............. G06Q 40/08; G06Q 30/0283; G06Q 30/0611; G06Q 50/16; G06Q 10/087; G06Q 30/0206; G06T 2219/004; G06T 1/0007
See application file for complete search history.

(56) References Cited

U.S. PATENT DOCUMENTS 5,189,606 A   2/1993  Burns et al.
5,697,001 A * 12/1997 Ring .................... G03B 17/24
                                                  396/121
(Continued)

FOREIGN PATENT DOCUMENTS

KR   1020170135260 A   12/2017
WO      2017191525 A2   11/2017

OTHER PUBLICATIONS

Long, Jonathan et al., Fully Convolutional Networks for Semantic Segmentation Computer Vision and Pattern Recognition, Mar. 8, 2015 (Year: 2015).*
(Continued)

*Primary Examiner* — Scott L Jarrett
(74) *Attorney, Agent, or Firm* — Pillsbury Winthrop Shaw Pittman LLP

(57) ABSTRACT

Systems and methods for providing AI-based cost estimates for services are disclosed. The method may comprise receiving, at one or more processors, data from a scanning of a location, the scanning performed by one or more of a camera, a computer vision device, an inertial measurement unit, or a depth sensor. Data may be received, at one or more processors, related to the identification of one or more key
(Continued)

elements at the location. An itemized statement and quote of work to be performed may be generated at one or more processors.

11 Claims, 13 Drawing Sheets

Related U.S. Application Data

(60) Provisional application No. 62/331,107, filed on May 3, 2016.

(51) Int. Cl.
    *G06Q 30/06*     (2012.01)
    *G06N 3/08*     (2006.01)

(56) References Cited

U.S. PATENT DOCUMENTS

| | | |
|---|---|---|
| 5,761,674 A | 6/1998 | Ito |
| 5,893,082 A | 4/1999 | McCormick |
| 5,918,219 A | 6/1999 | Isherwood |
| 6,446,053 B1 | 9/2002 | Elliott |
| 6,851,611 B1* | 2/2005 | Shaw-Sinclair ...... G06Q 10/087 |
| | | 235/462.45 |
| 6,996,503 B2 | 2/2006 | Jung |
| 7,415,435 B1 | 8/2008 | Weiss et al. |
| 7,447,337 B2 | 11/2008 | Zhang et al. |
| 7,487,111 B2 | 2/2009 | Shoen et al. |
| 7,551,849 B1* | 6/2009 | Abad ..................... G03B 17/24 |
| | | 396/310 |
| 7,620,575 B1 | 11/2009 | Tenorio |
| 7,783,523 B2 | 8/2010 | Lopez et al. |
| 7,899,823 B1* | 3/2011 | Trandal ................ G06Q 10/087 |
| | | 707/736 |
| 7,941,330 B1* | 5/2011 | Buentello ............... G06Q 40/02 |
| | | 705/4 |
| 8,065,123 B2 | 11/2011 | Wood |
| 8,219,558 B1* | 7/2012 | Trandal ................ G06Q 10/087 |
| | | 707/736 |
| 8,244,608 B2 | 8/2012 | Wood |
| 8,615,450 B1* | 12/2013 | Fanelli .................. G06Q 10/087 |
| | | 705/28 |
| 8,700,537 B1 | 4/2014 | Deshpande et al. |
| 8,731,234 B1 | 5/2014 | Ciarcia et al. |
| 8,774,471 B1* | 7/2014 | Laaser ................ G06K 9/00912 |
| | | 382/115 |
| 9,092,753 B1* | 7/2015 | Fanelli .................. G06Q 10/087 |
| 9,171,059 B2 | 10/2015 | Wood |
| 9,280,793 B2* | 3/2016 | English ............... H04L 61/2007 |
| 9,519,659 B2 | 12/2016 | Jain et al. |
| 9,767,566 B1 | 9/2017 | Paczkowski et al. |
| 9,785,835 B2 | 10/2017 | Pelz et al. |
| 10,032,225 B1* | 7/2018 | Fox ....................... G06Q 40/08 |
| 10,062,118 B1* | 8/2018 | Bernstein ............... G06Q 40/08 |
| 10,157,405 B1* | 12/2018 | Hopkins ................. G06Q 40/08 |
| 10,210,577 B1* | 2/2019 | Davis ..................... G06Q 40/08 |
| 10,223,750 B1* | 3/2019 | Loo ....................... G06Q 40/08 |
| 10,311,521 B1* | 6/2019 | Capone ................. G06Q 40/08 |
| 10,311,529 B1 | 6/2019 | Noel et al. |
| 10,332,138 B1 | 6/2019 | Bruce |
| 10,346,924 B1* | 7/2019 | Engelhorn ............. G06Q 40/08 |
| 10,354,232 B2 | 7/2019 | Tomlin et al. |
| 10,467,700 B1* | 11/2019 | Loo ....................... G06Q 40/08 |
| 10,521,865 B1* | 12/2019 | Spader ..................... G06T 7/60 |
| 10,528,962 B2* | 1/2020 | Rattner ............... G06Q 30/0206 |
| 10,657,490 B2* | 5/2020 | Lekas .................. G06Q 10/087 |
| 10,672,080 B1* | 6/2020 | Maurer ................. G06Q 20/34 |
| 10,867,328 B2 | 12/2020 | Rattner et al. |
| 10,885,589 B2* | 1/2021 | Sauer ................... G06Q 20/102 |
| 11,037,245 B1* | 6/2021 | Krieter .................. G06Q 40/08 |
| 2001/0037190 A1 | 11/2001 | Jung |
| 2001/0047250 A1 | 11/2001 | Schuller et al. |
| 2002/0035522 A1* | 3/2002 | Pilcher ................. H04N 1/2195 |
| | | 705/28 |
| 2002/0099725 A1 | 7/2002 | Gordon |
| 2002/0107661 A1 | 8/2002 | Ainlay et al. |
| 2002/0159627 A1 | 10/2002 | Schneiderman et al. |
| 2003/0028393 A1 | 2/2003 | Coulston et al. |
| 2004/0006521 A1* | 1/2004 | Diamant ................ G06Q 40/02 |
| | | 705/35 |
| 2004/0054568 A1 | 3/2004 | Bradley et al. |
| 2004/0122748 A1 | 6/2004 | Donald |
| 2004/0193474 A1 | 9/2004 | Digiacomo |
| 2005/0060236 A1* | 3/2005 | Iulo ..................... G06Q 30/0601 |
| | | 705/26.1 |
| 2005/0081161 A1 | 4/2005 | Macinnes et al. |
| 2005/0233767 A1 | 10/2005 | Ayyeppen et al. |
| 2006/0004598 A1 | 1/2006 | Boyd et al. |
| 2006/0015413 A1 | 1/2006 | Giovannoli |
| 2006/0098729 A1 | 5/2006 | Shen |
| 2006/0161462 A1* | 7/2006 | Sharma .................. G06Q 40/08 |
| | | 705/4 |
| 2006/0178902 A1* | 8/2006 | Vicars ................... G06T 1/0021 |
| | | 705/51 |
| 2007/0143123 A1* | 6/2007 | Goldberg ............. G06Q 10/087 |
| | | 705/4 |
| 2008/0082292 A1 | 4/2008 | Storm |
| 2008/0177581 A1* | 7/2008 | Artinger ................ G06Q 40/08 |
| | | 705/4 |
| 2008/0255914 A1 | 10/2008 | Oren |
| 2008/0262789 A1 | 10/2008 | Pershing et al. |
| 2009/0132436 A1 | 5/2009 | Pershing et al. |
| 2009/0174768 A1 | 7/2009 | Blackburn et al. |
| 2009/0198539 A1 | 8/2009 | Buzz |
| 2009/0259565 A1 | 10/2009 | Avisror et al. |
| 2009/0265193 A1* | 10/2009 | Collins .............. G06Q 30/0185 |
| | | 705/4 |
| 2010/0174564 A1* | 7/2010 | Stender ................. G06Q 40/08 |
| | | 705/4 |
| 2010/0211421 A1 | 8/2010 | Sciammarella et al. |
| 2011/0082782 A1 | 4/2011 | Komac et al. |
| 2012/0016773 A1 | 1/2012 | Strauss |
| 2012/0231424 A1* | 9/2012 | Calman .................. G09B 25/04 |
| | | 434/72 |
| 2013/0085782 A1 | 4/2013 | Raviv et al. |
| 2013/0132295 A1 | 5/2013 | Horowitz et al. |
| 2013/0151298 A1 | 6/2013 | Davis |
| 2013/0191183 A1 | 7/2013 | Kite et al. |
| 2013/0290033 A1* | 10/2013 | Reeser ................... G06Q 10/10 |
| | | 705/4 |
| 2013/0317860 A1* | 11/2013 | Schumann, Jr. ........ G06Q 40/08 |
| | | 705/4 |
| 2014/0074744 A1 | 3/2014 | Ben-Harosh et al. |
| 2014/0140610 A1 | 5/2014 | Tu et al. |
| 2014/0149306 A1 | 5/2014 | Olsen |
| 2014/0214473 A1 | 7/2014 | Gentile et al. |
| 2014/0222608 A1 | 8/2014 | Cohen et al. |
| 2014/0278809 A1 | 9/2014 | Ekman |
| 2014/0279167 A1 | 9/2014 | Miller et al. |
| 2014/0297468 A1 | 10/2014 | Patterson |
| 2015/0186953 A1 | 7/2015 | Gross |
| 2015/0228028 A1 | 8/2015 | Friedman |
| 2015/0310556 A1* | 10/2015 | Kiper .................. G06Q 30/0283 |
| | | 705/4 |
| 2015/0324924 A1 | 11/2015 | Wilson et al. |
| 2015/0371305 A1 | 12/2015 | Ganapathy |
| 2015/0379430 A1 | 12/2015 | Dirac et al. |
| 2016/0048934 A1 | 2/2016 | Gross |
| 2016/0055506 A1 | 2/2016 | Tama, Jr. et al. |
| 2016/0086231 A1 | 3/2016 | Darey |
| 2016/0092959 A1 | 3/2016 | Gross |
| 2016/0110816 A1* | 4/2016 | Cardin ............... G02B 27/0172 |
| | | 705/4 |
| 2016/0292761 A1 | 10/2016 | Saric |
| 2017/0024685 A1 | 1/2017 | Disorbo |
| 2017/0270612 A1 | 9/2017 | Howe et al. |
| 2017/0293894 A1 | 10/2017 | Taliwal et al. |
| 2017/0323319 A1* | 11/2017 | Rattner ................ G06N 20/00 |
| 2018/0075550 A1 | 3/2018 | Thornberry et al. |
| 2019/0020817 A1 | 1/2019 | Shan et al. |

(56) References Cited

U.S. PATENT DOCUMENTS

| | | | |
|---|---|---|---|
| 2019/0244267 A1* | 8/2019 | Rattner | G06N 20/00 |
| 2020/0134734 A1* | 4/2020 | Aneesh | G06N 3/08 |
| 2020/0151749 A1* | 5/2020 | Rattner | G06Q 30/0283 |

OTHER PUBLICATIONS

Girshick, Ross, Fast R-CNN Microsoft, Sep. 2015 (Year: 2015).*
Girshick, Ross et al., Rich feature hierarchies for accurate object detection and semantic segmentation Computer Vision and Pattern Recognition, Oct. 2014 (Year: 2014).*
Wierema, Sam, Build your own Siri: Api.ai offers voice integration for all TheNextWeb.com, Sep. 16, 2014 (Year: 2014).*
European Office Patent Office, Office Action issued in EP Patent Application No. 17792566.6, dated May 11, 2021, pp. 1-9.
Xu et al., "Data-driven shape analysis and processing", Computer Graphics Forum, Feb. 2015, pp. 1-27, XP055797933, 2 Penn Plaza, Suite 701, New York, NY 10121-0701 USA.
Ranft et al., "The Role of Machine Vision for Intelligent Vehicles", IEEE Transactions On Intelligent Vehicles, Mar. 2016, pp. 8-19, vol. 1(1), XP011617378.
European Patent Office, Action issued in EP Patent Application No. 19167503.2, dated Jul. 16, 2020, pp. 1-11.
United States Patent and Trademark Office, Office Action issued in U.S. Appl. No. 16/374,449, filed Jan. 31, 2020, pp. 1-33.
Patent Cooperation Treaty, International Search Report for PCT/IB2017/052324, dated Jun. 29, 2018, pp. 1-2.
Patent Cooperation Treaty, International Preliminary Report on Patentability for PCT/IB2017/052324, dated Nov. 15, 2018, pp. 1-6.
Fischer, Evan, Handy Man DIY Practically Renovates for You Pocketfullofapps.com, Jun. 19, 2012 (Year: 2012).
Redbeacon.com web pages Redbeacon, May 2012, Retrieved from Archive.org Jan. 6, 2015 (Year: 2012).
Crook, Jordan, Redbeacon Home Services Marketplace Launches Android App, Refocuses on Mobile Techcrunch.com, Oct. 22, 2012 (Year: 2012).
HomeTechOnline, Hometechonline.com, Retrieved from Archive.org, Feb. 2007, pp. 1-84.
Graphisoft Inc., Graphisoft Constructor 2005 Tutorial, 2005, pp. 1-52.
Eaton, Kit, "Guiding D.I.Y. Home Repairs, or Summoning the Pros", The New York Times, Nov. 26, 2012, pp. 1-2.
Rao, Leena, Home Services Marketplace Redbeacon Launches iPhone App to Get Quotes on The go, International CES, 2015, pp. 1-2.

* cited by examiner

ARTIFICIAL INTELLIGENCE GENERATION OF AN ITEMIZED PROPERTY AND RENTERS INSURANCE INVENTORY LIST FOR COMMUNICATION TO A PROPERTY AND RENTERS INSURANCE COMPANY

CROSS-REFERENCE TO RELATED APPLICATIONS

This application claims priority to U.S. patent application Ser. No. 15/494,423, filed on Apr. 21, 2017 and entitled "ARTIFICIAL INTELLIGENCE PREDICTION ALGORITHM FOR GENERATING AN ITEMIZED STATEMENT OF WORK AND QUOTE FOR HOME SERVICES BASED ON TWO DIMENSIONAL IMAGES, TEXT, AND AUDIO", which claims priority and benefit to U.S. Provisional Application No. 62/331,107, filed on May 3, 2016 and entitled "SYSTEMS AND METHODS FOR PROVIDING AI-BASED COST ESTIMATES FOR SERVICES", the contents of which are incorporated herein by reference in their entirety.

FIELD OF THE DISCLOSURE

This disclosure relates to systems and methods for providing artificial intelligence (AI)-based cost estimates for services.

BACKGROUND

Conventional systems and methods for providing cost estimates for services are lacking. The way estimates are done today are either inaccurate (phone calls/web forms) or very expensive to administer (in-person estimates). There are also some newer estimating solutions that are essentially video calls (one may think of them like a skinned Facetime or Skype app), but these solutions still require synchronous estimator interactions to administer and thus may be expensive.

SUMMARY

One aspect of the disclosure relates to a system configured for providing artificial intelligence-based cost estimates for services. The system may comprise one or more hardware processors configured by machine-readable instructions to perform various functions. The functions may comprise receiving, at one or more processors, data from a scanning of a location, the scanning performed by one or more of a camera, a computer vision device, an inertial measurement unit, or a depth sensor. Data may be received, at one or more processors, related to the identification of one or more key elements at the location. An itemized statement and quote of work to be performed may be generated at one or more processors.

Another aspect of the disclosure relates to a method for providing artificial intelligence-based cost estimates for services. The method may comprise receiving, at one or more processors, data from a scanning of a location, the scanning performed by one or more of a camera, a computer vision device, an inertial measurement unit, or a depth sensor. Data may be received, at one or more processors, related to the identification of one or more key elements at the location. An itemized statement and quote of work to be performed may be generated at one or more processors.

DETAILED DESCRIPTION

Some embodiments according to the present technology provide a novel way of providing upfront, accurate cost/price estimates by using a deep learning/natural language processing powered system. The present technology may make home services price estimates into a more interactive experience. Consumers may add and remove services like moving/packing specific items. This may be similar to how one may add and remove products to an Amazon shopping cart.

Some embodiments according to the present technology may provide the ability to perform targeted actions based on items discovered by AI. One example may relate to moving. If, for example, a bed is discovered, a specific targeted action may be asking the consumer if disassembly is needed. A suggestion to provide upselling services (e.g., packing etc.) if a kitchen cabinet is detected with the actual cost being quoted.

Some embodiments according to the present technology may include the ability to ask targeted questions automatically based on images sent. Consider moving as an example. The system may ask if a wall unit is bolted to the ground once detected and use the consumer's answer to update a quote.

In some embodiments, the ability for consumers to correct and/or update quotes may be provided. For example, if a bed was incorrectly detected as a sofa, consumers may interactively change the item name and have it reflected in the cost. If the AI detects an item that the consumer wants to exclude from the quote (maybe they plan on moving it themselves), they may remove the item and the quote may update in real-time or near real-time.

Analysis from AI may be used to predict the cost of a service (e.g., detecting number of items, size and weight of items and translating this into cost). Home service providers may further augment information sent by consumers to update a quote. The ability to automatically send targeted pictures from data sent by consumers as part of the quote, either in a web form or in a pdf, may be provided. This feature may be referred to as "visual quote." The ability to sell affiliate services (e.g., home insurance etc.) based on the inventory of items detected may be provided, in some embodiments.

Figure 1:
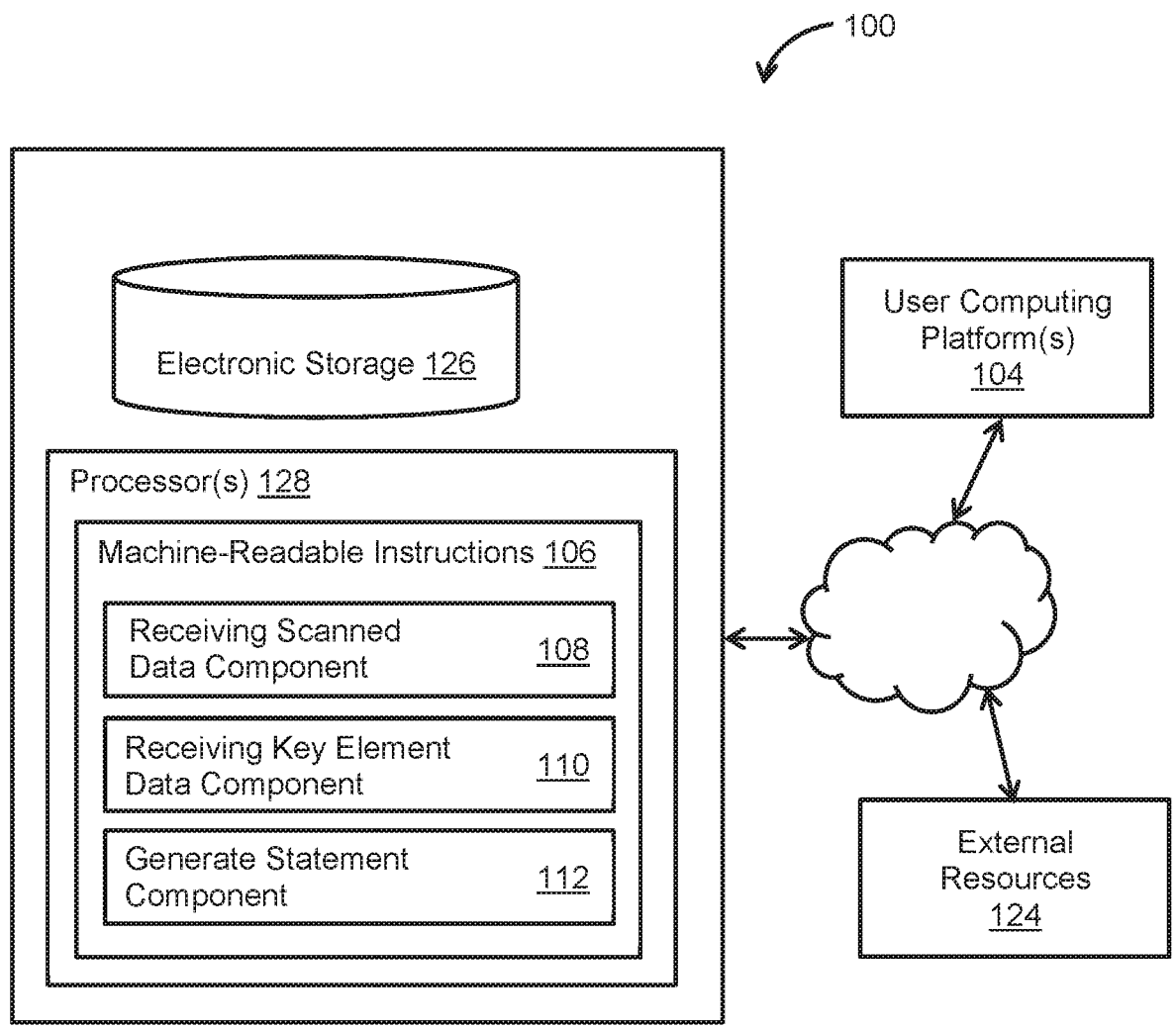
FIG. 1 illustrates a system for providing AI-based cost estimates for services, in accordance with one or more implementations.

FIG. 1 illustrates a system configured for facilitating keyboard-based search of local and connected digital media items, in accordance with one or more implementations. In some implementations, system 100 may include one or more server 102. The server(s) 102 may be configured to communicate with one or more user computing platforms 104 according to a client/server architecture. The users may access system 100 via user computing platform(s) 104.

Digital media items may include one or more of digital photos, images, videos, audio, and/or other digital media items. Local digital media items may include digital media items stored locally at a given user computing platform 104. Connected digital media items may include digital media items stored remotely from a given user computing platform 104 such as at other user computing platforms 104, at other locations within system 100, and/or locations outside of system 100. Connected digital media items may be stored in the cloud.

The server(s) 102 and/or computing platform(s) 104 may be configured to execute machine-readable instructions 106. The machine-readable instructions 106 may include one or more of a receiving scanned data component 108, a receiving key element data component 110, a generate statement component 112 and/or other components. In some embodiments, some or all of the components may be located in computing platform(s) 104. The AI work may be performed in one or more of the cloud, a mobile device, and/or other devices. The receiving scanned data component 108 may be configured to receive, at one or more hardware processors, data from a scanning of a location, the scanning performed by one or more of a camera, a computer vision device, an inertial measurement unit, or a depth sensor. The receiving key element data component 110 may be configured to receive, at one or more hardware processors, data related to the identification of one or more key elements at the location. The generate statement component 112 may be configured to generate, at one or more processors, an itemized statement and quote of work to be performed. Various other components are contemplated. For example, a launch indication component may be configured to receive, at one or more hardware processors, an indication of a launch of an app or other messaging channel.

In keeping with some embodiments according to the present disclosure, estimating the cost for home painting may be a function of predicting the amount of material needed and/or the duration to complete the job. Generating cost estimates automatically through algorithms may be desirable since most painting companies currently require their employees to physically inspect the paint site before the job, which increases the cost of the painting service or to reduce the time it takes for on-site estimators to provide the cost estimate.

To estimate the amount of material needed and/or the work duration, several factors may need to be considered including the surface area of the components to paint, and/or other factors. Other factors may include one or more of surface type, surface texture, surface material, preparation work, blemishes, cleanup work, and/or other factors.

Surface type may include wall, baseboard, trim, ceiling, door, and/or other surface types. Paint type may be determined based on the surface type (e.g., high gloss white for trim, eggshell for walls, flat white for ceiling).

Surface texture and/or surface/material may include flat, textured, and/or other surface texture and/or surface/material. Surface texture and/or surface/material may determine how many coats of paint may be needed. Preparation work may include repairing blemishes such as old paint colors, ding/dents, scratches, marks, and/or other blemishes.

Other factors may include determining if primer, patching, sanding, caulking, and/or sealing may be needed. Other preparation work may include moving furniture, décor, and/or other items. Further preparation work may further include covering carpets, furniture, home wares, and/or other items. Still further preparation work may include removing, replacing, and/or covering electrical face plates and/or light switches. Other preparation work may include plant covering and/or protection. Other preparation work may include washing surfaces to be painted. Cleanup work may include disposing coverings, disposing leftover paint, and/or other cleanup work.

The present disclosure involves using computer vision using cameras and optional depth sensors on the smartphone and/or inertial measurement unit (IMU) data (e.g., data collected from an accelerometer, a gyroscope, a magnetometer, and/or other sensors) in addition to text data: questions asked by a human agent or an AI algorithm based on sent images, videos, and previous answers as well as answers by the consumer on a mobile device (e.g., smartphone, tablet, and/or other mobile device) to come up with an estimate of how much it will cost to perform a paint job.

In some implementations, a workflow may include a user launching an app or another messaging channel (SMS, MMS, Facebook Messenger, web browser, etc.) and scans a location (e.g., a home and/or another location) where camera(s) data and/or sensor(s) data may be collected. The app may use the camera and/or IMU and optionally a depth sensor to collect and fuse data to detect surfaces to be painted and estimate their surface area data, in addition to answers to specific questions. An AI algorithm (or neural network etc.) specifically trained to identify key elements may be used (e.g., walls, ceiling, floor, and/or other objects). Other relevant characteristics may be detected including identification of light switch/electrical outlets that would need to be covered or replaced, furniture that would need to be moved, carpet/flooring that would need to be covered, and/or other relevant characteristics.

The user may optionally enter what brands of paint may be preferred for each area. Areas may include wall, trim, ceiling, baseboard, door, and/or other areas. The messaging channel may sell leads to paint suppliers to promote their products in relevant spaces. This may be optionally implemented as an automated advertising network where the bidding process may be started by an algorithm determining a category of product that would be useful to the consumer (e.g., high gloss trim paint), then auctioning off ad real estate to the highest bidder in the category (e.g., suggesting Dunn Edwards versus Sherwin Williams, for example).

In some implementations, a consumer app working along with a backend infrastructure may generate an itemized statement of work. For example, for one or more rooms, the system may give an estimated square footage on walls, trim, ceiling, baseboard, door, and/or other items.

In some implementations, an AI algorithm may ask targeted questions based on images/videos sent by the user to perform further analysis. An AI improvement engine may give a dollar amount estimate for various rooms and/or locations. Itemized lists may include paint costs based on square footage and number of coats, setup costs based on time and/or work involved, cleanup costs based on type of work requested, and/or other items.

Examples of setup costs may include but are not limited to: "Move sofa, coffee table, and love seat to center of room, cover with plastic" (could use furniture detector from moving AI component); identify if ladder may be needed based on wall height and/or whether ceilings may be included in the work estimate; and/or "Replace two damaged electrical outlet covers, tape over remaining three electrical outlet covers."

In some implementations, users may review itemized quotes and/or make changes if desired (e.g., painting trim may be too expensive, so they may choose to remove that item). Quotes may update in real-time or near real-time. Once a quote looks acceptable, user may book the painting job from the app. Users may manually select items that the estimation algorithm has not discovered (e.g., a wall the user wants painted that was missed by the technology, disassembly of any items that would hinder the painting process, and/or other items) or add corrections to any possible mistakes made by the algorithm (e.g., the wall detected also contains some surface area of the ceiling or floor). Users may add and remove items from the itemized quote. Adding and/or removing items may be similar to adding and/or removing items in an online shopping cart.

In some implementations, the app along with the backend may analyze the light in the room, color and/or texture of other items in the room to suggest appropriate paint colors. Quote information with relevant photos and/or videos extracted from the surveying process may be sent electronically to the painter's backend system for fulfillment.

In some implementations, estimating the cost for washing windows may be a function of how many, how large, and/or how accessible the windows are. This may be automated with algorithms.

In some implementations, parameters may be desired and/or required to give an accurate window washing quote including size of windows, number of windows, washing areas (e.g., inside, outside, and/or both), quality and/or condition of windows, accessibility (e.g., floor the windows may be on), outside impediments (e.g., trees, shrubs, HVAC units, and/or other impediments), type of wash required (e.g., hand squeegee, power wash, and/or other types of wash), and/or other parameters. As a problem prevention measure, notifying the user before scheduling a power wash may be desirable if the windows are detected to fit poorly. The present disclosure allows these parameters to be determined algorithmically so an accurate window washing quote may be given through an app.

In some implementations, a workflow may include the following. A user may launch an app or another messaging channel (SMS, MMS, Facebook Messenger, web browser, etc.) and walks around a one or more of a home, office, and/or another location. A computer vision/IMU techniques may be used similar to the painting solution where the windows may be detected and their square footage may be estimated by AI algorithm. An AI algorithm (or deep neural nets etc.) may be trained to identify common impediments such as bushes, trees, HVAC units, patio furniture, and/or other items. The user may enter whether the quote may be for internal, external, or both. This information may be inferred using an AI algorithm (or deep neural nets) based on an analysis of the video itself (e.g., if half the video was shot indoors and half was taken outdoors, perhaps the user wants both). The user may enter the floor/number of stories that are desired to be washed. In some implementations, this may be inferred from the AI algorithm, GPS altimeter data, and/or IMU data. An AI algorithm may cause targeted questions to be asked based on images and/or videos sent by the user to perform further analysis. A user may enter the type of wash required. In some implementations, this may be accompanied by suggestions from the AI algorithm (e.g., if a lot of dirt/grime was detected on the windows, the app may suggest a power wash would be better). The app may work with a backend infrastructure and may generate an itemized quote(s) with line items for factors including a time estimate(s) based on number of windows, accessibility issues that could add delay/time to the work, type of wash requested, washing inside/outside/both, and/or other factors. A user may review an itemized quote(s) and/or makes changes if desired (e.g., adding inside may be too expensive, and changes should be made to the outside and not the inside). Once the quote looks good, user may book the window washing job from the app. Quote information with relevant photos and/or videos may be extracted from the surveying process may be sent electronically to the window washer's backend system for fulfillment.

Estimating for junk removal may be largely a volume estimation problem. Currently, junk removal companies require the customer to estimate themselves what proportion of a truck they need to remove their junk. This process may not be accurate since most customers are not experts at volume estimation, and may be commonly mitigated by sending human surveyors. It may be desirable from both a consumer and business provider standpoint to provide an automated way to obtain an accurate junk removal quote. The present disclosure describes one such way of doing so using computer vision techniques, artificial intelligence algorithms, and/or inertial measurement unit (IMU) data.

In some implementations, a workflow may include a user launching an app or another messaging channel (SMS, MMS, Facebook Messenger, web browser, etc.) and scanning junk they would like to have removed. The app may collect camera frames and IMU data to estimate the dimensions and volume of the material to be removed data in addition to answers to specific question. An AI algorithm (or deep neural network) trained for object identification may be used to estimate the dimensions and volume of the material to be removed and/or identify what the material and/or item may be (e.g., chair, sofa, paint, and/or other materials/items). An AI algorithm may instead directly estimate the total volume of all the items the consumer wants to remove without detecting individual items. An AI algorithm may ask targeted questions based on images and/or videos sent by the user to perform further analysis. The app working with a backend infrastructure may generate an itemized quote of the junk to be removed or may just generate the total volume or total cost. The cost associated with the junk removal may be calculated based on the volume of the junk and/or estimated time required to disassemble the junk. In some implementations, an external cloud server may provide time estimates for how long it takes to disassemble various items. The cloud server may perform logistic regression and/or other machine learning techniques to estimate disassembly time based on category, size, volume, and/or other factors. The cloud server may identify a blacklist of hazardous materials or any surcharge items (e.g., oil, batteries, fireworks, and/or other hazardous materials) and notify the customer that such items require special disposal techniques. If available, other relevant service companies able to perform the task may be recommended (e.g., the ad network approach as described above may be used to suggest a service provider).

In keeping with some implementations of the workflow, the user may review the itemized quote and makes necessary changes as desired. By way of non-limiting example, if the disassembly of the dining table adds too much cost, they may remove that line item and the price updates in real time. The AI Improvement engine allows the AI algorithm to learn from human corrections (user or other human reviewer). Once the quote looks good, user may book the junk removal job from the app or other messaging channels. Quote information with relevant photos and/or videos may be extracted from the surveying process and may be sent electronically to the junk remover's backend system for fulfillment.

In some implementations, estimating the cost of moving one's belongings from one place to another may be a function of multiple variables that may include but is not limited to the various things. These things may include the number of items (e.g., furniture, boxes, special items like a piano, delicate items, and/or other items); the size and weight of the above items; if assembly and/or disassembly may be needed; if items need to be packed and if special care needs to be given while packing (e.g., fragile items); if the to and/or from address(es) have a dedicated and/or shared elevator(s), the number of stairs a mover needs to carry the items; the walk between the front door of the house and/or apartment to the truck; the distance between the from and the to address as well as traffic during time of day; and/or any other regulatory restrictions that may depend on the location of the user (city, county, state, country, etc.).

Currently, movers may be unable to give an accurate upfront quote to end customers without sending an appraiser home. Even if an appraiser was sent to a customer's home, they most likely end up only visiting the address the customer moves from and not the address to which the customer moves. The present disclosure improves computer functionality and describes an automated way of providing accurate moving estimates using techniques in computer vision, artificial intelligence, deep learning, and/or sensor (IMU) data in addition to text data: questions asked by a human agent or an AI bot based on sent images, videos and previous answers as well as answers by the consumer from a smartphone and/or other device.

In some implementations, a workflow may include a user launching an app or another messaging channel (SMS, MMS, Facebook Messenger, web browser, etc.) on a smartphone, tablet, and/or other device and scanning their room(s) and/or other locations. The app may collect camera frames and/or IMU data in addition to answers to specific questions. An AI algorithm (or deep neural network etc.) trained for object identification may be used to identify objects in the room, and/or to estimate the dimensions and/or volume of the objects. Such a technique may combine artificial intelligence techniques such as a deep neural network and sensor (IMU) data to generate an accurate identification of the object, its size and its weight. The technology may generate an itemized list of every single object (or a plurality of objects) that may be possessed by the individual. An AI algorithm may ask targeted questions based on images and/or videos sent by the user to perform further analysis (e.g., questions may relate to whether the cabinet full or empty, whether the user can also send a video or picture after opening the cabinet, whether the cabinet bolted to the floor, etc.). The AI algorithm may also ask for additional pictures or video. An AI algorithm may use answers to questions asked by a trained human agent to perform further analysis. Location information (e.g., the from and/or to address) may be taken as input either from the user and/or automatically by turning on location sensors in the phone or other device. This information may be combined with various sources of data (publicly available or otherwise) such as driving time, driving distance, number of floors in all locations, if any intermediate stop may be needed, the availability of a shared or dedicated elevator, and/or the distance of the walk from the home to the where the truck may be parked or other regulatory information based on the location of the user. An itemized quote may be generated by combining the above information with the objects detected in the room or other location and thereby providing an accurate cost estimate for moving every single object or for additional services (disassembly, packing, etc.). The itemized quote may be provided to the consumer app (with the app working with a backend). The object detection algorithm may identify objects and their dimensions and/or may generate insightful options based on the detection (e.g., if a delicate piece of china is detected, the technology may suggest a packing service to the customer and the cost for packing while simultaneously comparing the time it may take the customer to pack it themselves). The technology may identify items that need assembly and disassembly and suggest it as options with the appropriate cost. The app may call a junk removal service for items that the customer does not want to have moved but would rather have it donated or discarded. The user may review the itemized quote and make necessary changes as desired. By way of non-limiting example, if the disassembly of a dining table adds too much cost, the user may remove that line item and the price may update in real-time. Once the quote looks good, the user may book the moving job from the app. Users or service providers may manually select items that the estimation algorithm has not discovered and label them (e.g., a chair that was partially occluded by a dining table). In case the object may be not detected, users may be able to draw a simple bounding box in the app which may then be sent to the backend for further processing to select the item. Users may add and/or remove items from the itemized quote in a similar fashion to how they may add and/or remove items to an online shopping cart or through a simple user interface such as swiping left to discard an item (that is not part of moving quote) and swiping right to add the item to the moving quote. Quote information (which could be an inventory list, cube sheet, etc., and may or may not contain price information) with relevant photos and/or videos extracted from the surveying process may be sent electronically to the mover's backend system for fulfillment.

There may be multiple concerns shoppers face when shopping for furniture. Aside from cost and comfort considerations which consumers may be able to experience when they visit a furniture showroom, there may be several considerations which may not be solved in a feasible way even with visiting a furniture shop. Considerations may include "Will my new furniture fit my room?", "How well would it go with my existing items?", "Does the color match the overall decor?", and/or other considerations. The present disclosure may solve such problems using a combination of smartphone technology where the camera and/or sensor (IMU) information may be fused with techniques in computer vision and/or artificial intelligence.

In some embodiments, a workflow may include a user launching an app or another messaging channel (SMS, MMS, Facebook Messenger, web browser, etc.) on one or more of a smartphone, tablet, and/or other device and scanning their room(s) or other locations. The app may collect one or more of camera frames, IMU data, and/or other data. An AI algorithm (or deep neural network) trained for object identification may be used to identify objects (furniture, lamps, and/or other items) in the room, and/or to estimate the dimensions and/or volume of the objects. Such a technique may combine artificial intelligence techniques such as a deep neural network and/or sensor (IMU) data to generate an accurate identification of the object, including the object's size and/or weight. Users may be able to tap on objects detected by the detection algorithm they want replaced. In case the object may be not detected, users may be able to draw a simple bounding box in the app which may then be sent to the backend for further processing to select the item. The algorithm may automatically match the item size with a similar item of a similar size. Users may then add preference of selection of one or more of color, material, fabric, and/or other preferences. The app working with a backend may suggest recommended items based on one or more of size, type and/or other aspects of an item chosen and/or on how well the recommended item matches with other items and/or paint color in the room. An AI algorithm may ask targeted questions based on images/videos sent by the user to perform further analysis (e.g., asking the user to take a picture from a different angle etc.). An item may be then displayed on the screen superimposed on the actual image with the correct dimensions. To choose a single item, the user may want the AI to completely redecorate the house or other location. In that case, the AI with knowledge of existing items, their relative location, and/or other surrounding information (e.g., accessories, wall color, and/or other surroundings) may recommend items and/or lay the items out in a virtual pattern for display to the user via a user interface on the smartphone screen. The users may be given a choice to purchase one or more items directly from the smartphone and/or other device. The app may sell leads to furniture suppliers to promote their products in relevant spaces. This may grow into an automated advertising network where the bidding process may be started by an algorithm determining a category of product that would be useful to the consumer (e.g., leather sofa etc.), then auctioning off ad real estate to the highest bidder in the category.

Currently the process of obtaining a renter's insurance, homeowner's insurance, homeowner's warranty, and/or hazard insurance quote may depend on the value of the user's individual possessions. The process of getting a quote may rely on users calling the insurance company and describing their possessions. The present disclosure describes an automated way for users to obtain insurance quotes, save their data, and/or automatically verify with insurance companies in case of loss.

In some embodiments, the workflow may include the following. A user may launch an app or another messaging channel (SMS, MMS, Facebook Messenger, web browser, etc.) on a smartphone, tablet and/or other device and scan their room(s) and/or other location(s). The app may collect camera frames, IMU data, and/or other data. An AI algorithm (or deep neural network) trained for object identification may be used to identify objects in the room, and/or to estimate the dimensions and/or volume of the objects. To identify items, the object detection technology may be able to identify auxiliary information such as brand of item and/or its estimated cost. The app working with a backend may generate an itemized list of objects that the user owns. The user may be able to select items the object detection technology may not be able to detect on the app by drawing a simple bounding box and/or annotating the object with the correct label (e.g., TV, speakers, and/or other objects). The app may ask for further information (e.g., brand, year of purchase, and/or other information). An AI algorithm may ask targeted questions based on images/videos sent by the user to perform further analysis. Once the user is sufficiently satisfied, the list may be sent to different insurance companies to get a competitive quote. The data for the user may be saved until it needs to be updated and/or a claim event happens. In case of a claim event, the claim may be verified and/or users may be paid automatically based on the list of items in their possession as verified by the app. In some implementations, the claim verification process may be performed in the app using visual and/or audio inspection trained by deep neural nets.

Figure 2:
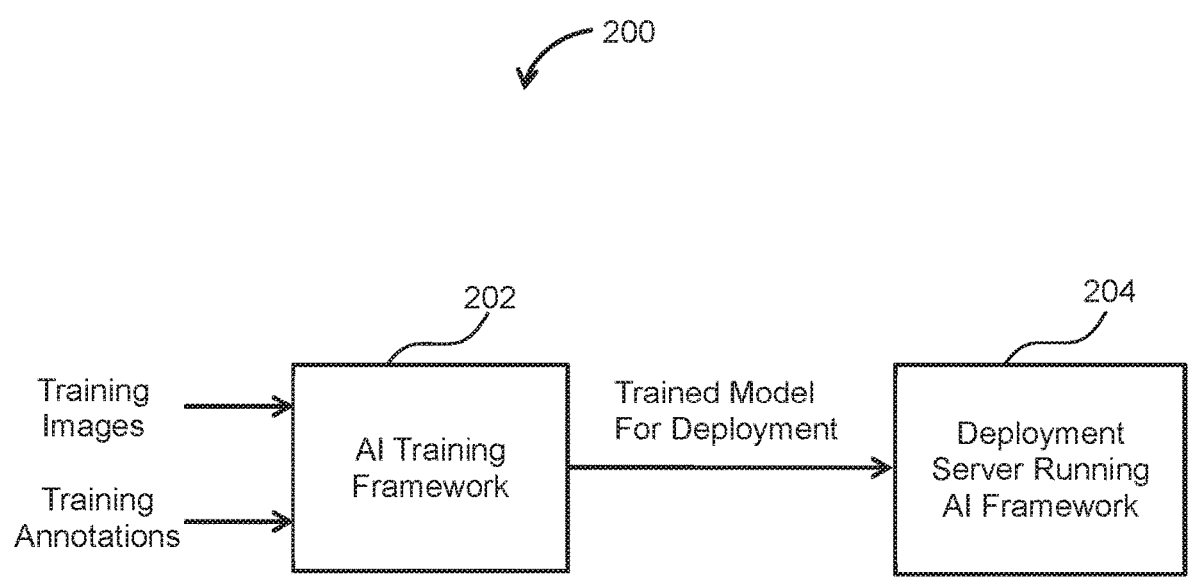
FIG. 2 illustrates an artificial intelligence (AI) model that may be trained to recognize objects, in accordance with one or more implementations.

FIG. 2 illustrates an artificial intelligence (AI) model 200 that may be trained to recognize objects, in accordance with one or more implementations. Multiple training images with objects that need to be detected may be presented to the artificial intelligence (AI) framework 202 for training. Training images may contain non-objects such as walls, ceilings, carpets, floors, and/or other non-objects. Each of the training images may have annotations (e.g., location of objects of desire in the image, coordinates, and/or other annotations) and/or pixel wise classification for objects, walls, floors, and/or other training images. Responsive to training being complete, the trained model may be sent to a deployment server 204 running an AI framework. The deployment server 204 may be a standalone server and/or a module that may be deployed as part of an app in a user's smartphone, tablet, and/or other personal computing device, in accordance with one or more implementations.

Figure 3:
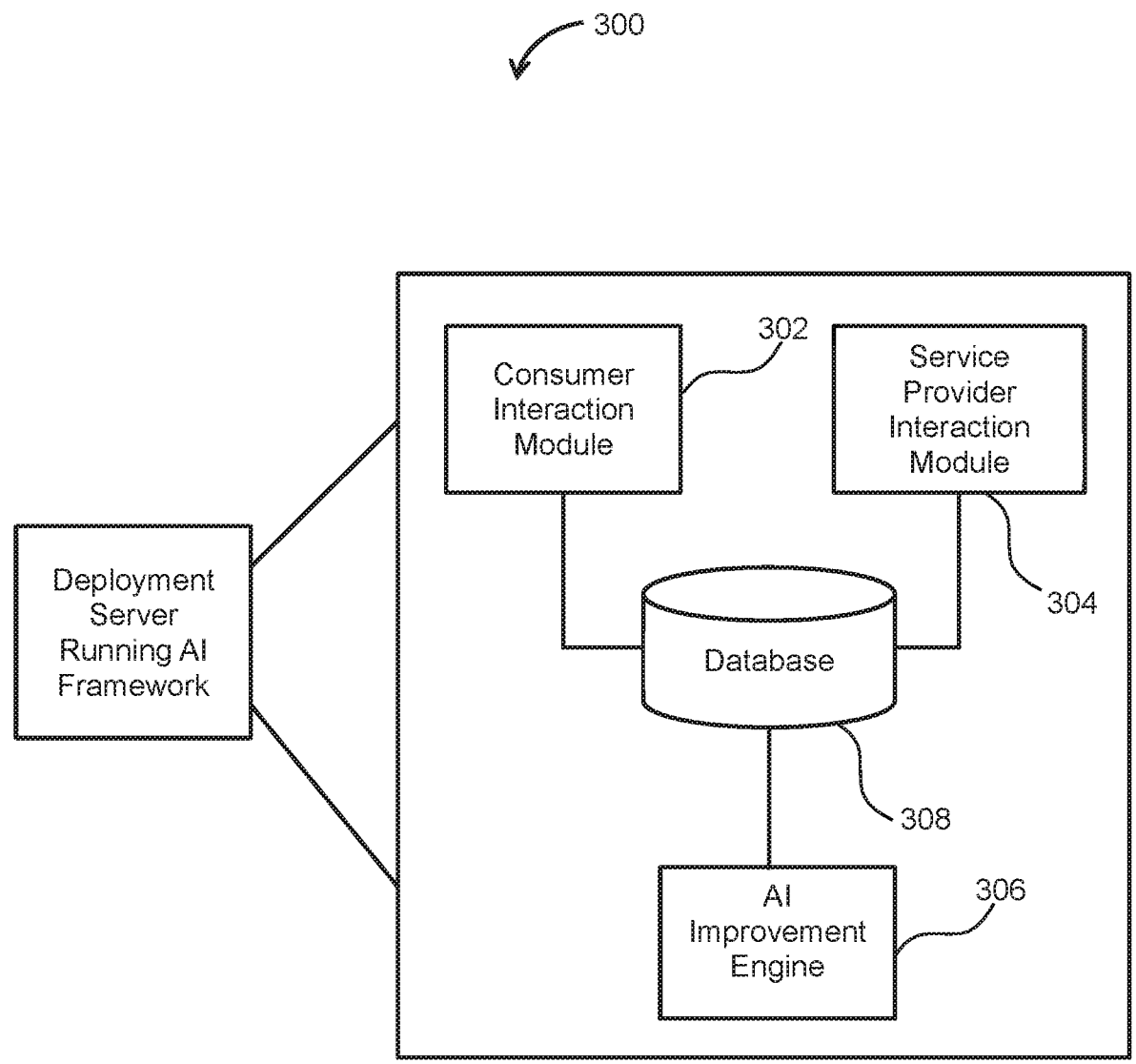
FIG. 3 illustrates an exemplary system wherein a deployment server running an AI framework may include a consumer interaction module, a service provider interaction module, a database, and an AI improvement engine. The AI improvement engine may run on one or more of machine learning algorithms, AI algorithms, and/or other algorithms, in accordance with one or more implementations.

FIG. 3 illustrates details of how a deployment server 300 running AI framework may be architected. It may include one or more of a consumer interaction module 302, a service provider interaction module 304, an AI improvement engine 306, a database 308, and/or other elements.

The consumer interaction module 302 may ingest data from a consumer, store the data in database 308, analyze the data with AI models for processing, and possibly communicating a quote back to a consumer. The consumer interaction module 302 may ingest one or more of text, video, pictures, audio, and/or other things from a user.

In some embodiments, the service provider interaction module 304 may serve as an interface to allow service providers to review information from consumers and AI analysis, make corrections if needed, and communicate with a user. The provider interaction module 304 may have the capability for a service provider to review the quote, send it back to the user through the appropriate messaging channel, or export to pdf and send it via another channel.

The AI improvement engine 306 may combine the original analysis output from the AI with any changes made by a consumer, service provider, or dedicated human reviewer and provide feedback to the AI framework to improve the trained model. The AI improvement engine 306 may also host the AI framework which runs multiple machine learning models to be used on the data sent from the consumer as well as a service provider.

Figure 4:
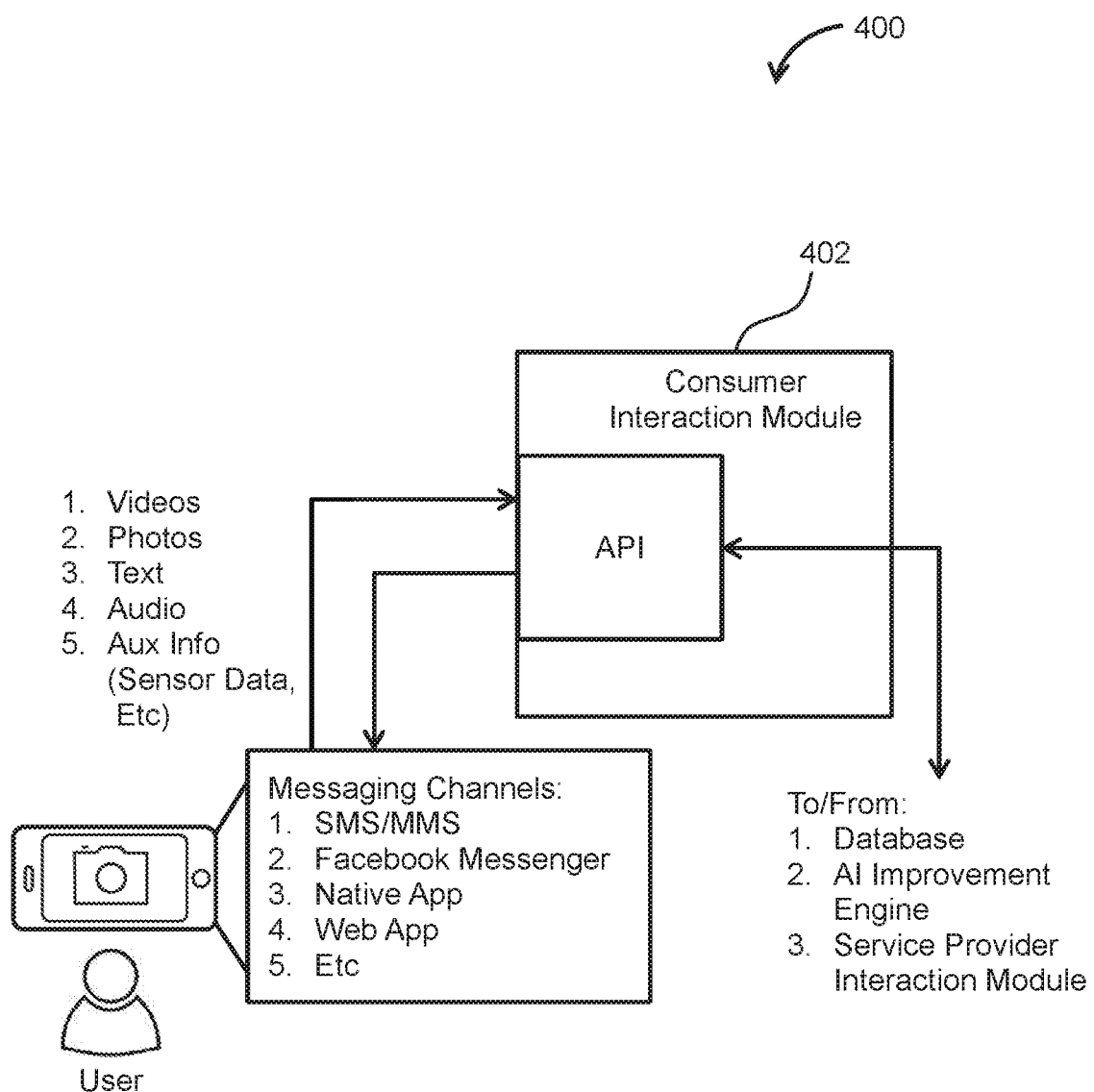
FIG. 4 illustrates an exemplary system wherein a user may send and receive information to/from a consumer interaction module in a deployment server running an AI framework, in accordance with one or more implementations.

FIG. 4 illustrates an exemplary system 400 wherein a user sends information to a consumer interaction module running on a deployment server 402. The user's app or another messaging channel (SMS, MMS, Facebook Messenger, web browser, etc.) may record camera frames, sensor (IMU) information, and/or other information including text data (answers to questions asked by a human agent or targeted questions asked by an AI algorithm based on data that was already sent). Objects may be tracked on the user's smartphone, tablet, and/or other personal computing device to send the relevant camera frames to the deployment server 402. The deployment server 402 may use the camera frames and detect objects in the camera frame. The deployment server 402 recognizes and finds size of object through other computer vision techniques leveraging the sensors (e.g, IMU). As output the deployment server 402 may generate lists of detected objects and/or detected non-objects as well as any size, dimension and weight information. The deployment server may reside on-device or the functionality may be split between an on-device server and a server in the cloud.

Figure 5:
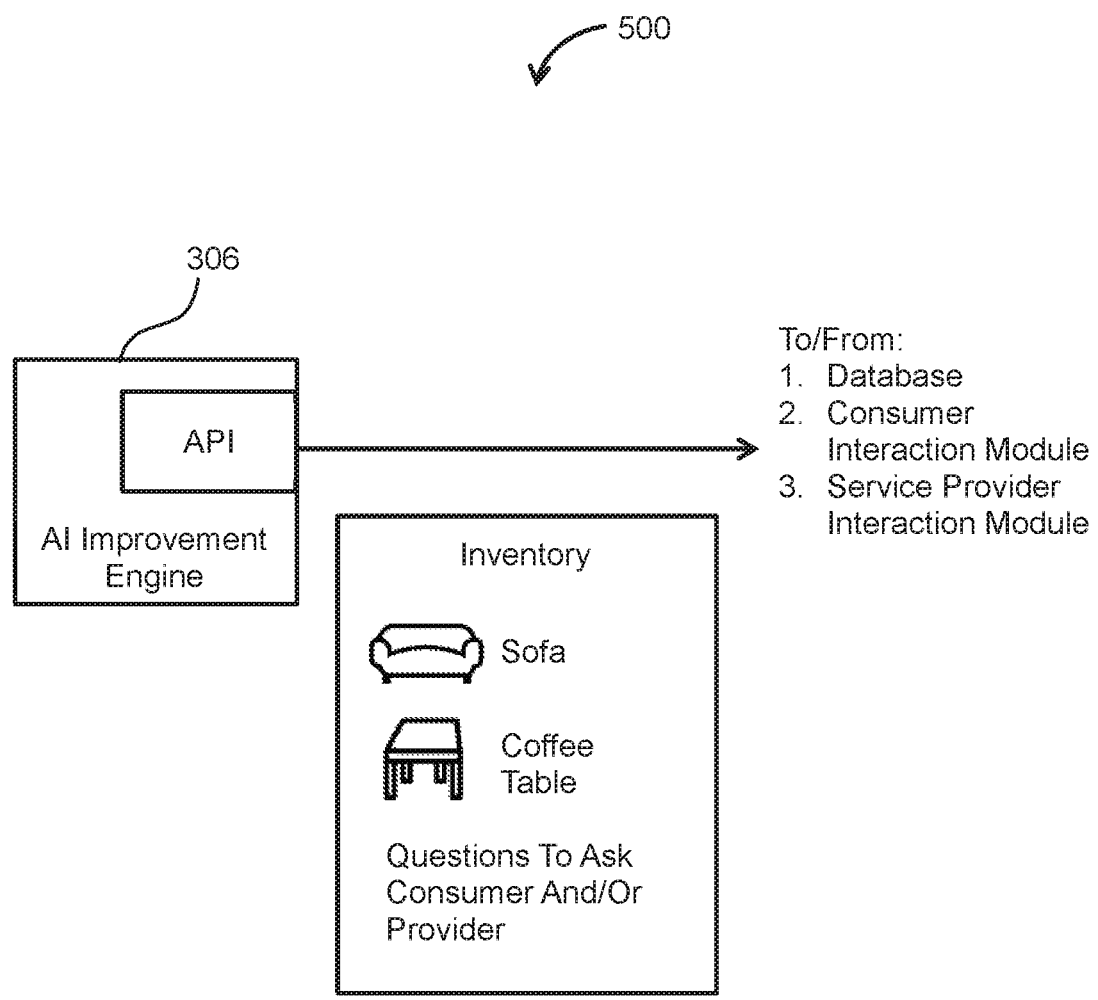
FIG. 5 illustrates an exemplary system wherein the AI improvement engine may output detected objects and other non-objects with various attributes (size, dimensions, locations, area, etc.) (and may create an inventory), as well as follow-up questions to ask of a consumer(s) and/or service provider(s), in accordance with one or more implementations.

FIG. 5 illustrates an exemplary system 500 wherein detected objects may create an inventory, size and/or weight information for objects that are detected as well as create a list of questions that the AI algorithm may need to provide a more accurate data to service provider or user (for e.g.: questions on the pictures sent by the user or follow up questions based on past responses). This may be facilitated by a question answering component (not shown for purposes of clarity) which can reside in the AI improvement engine or the consumer interaction module. The inventory with the request for additional inputs may be sent to the user or to a service provider.

Figure 6:
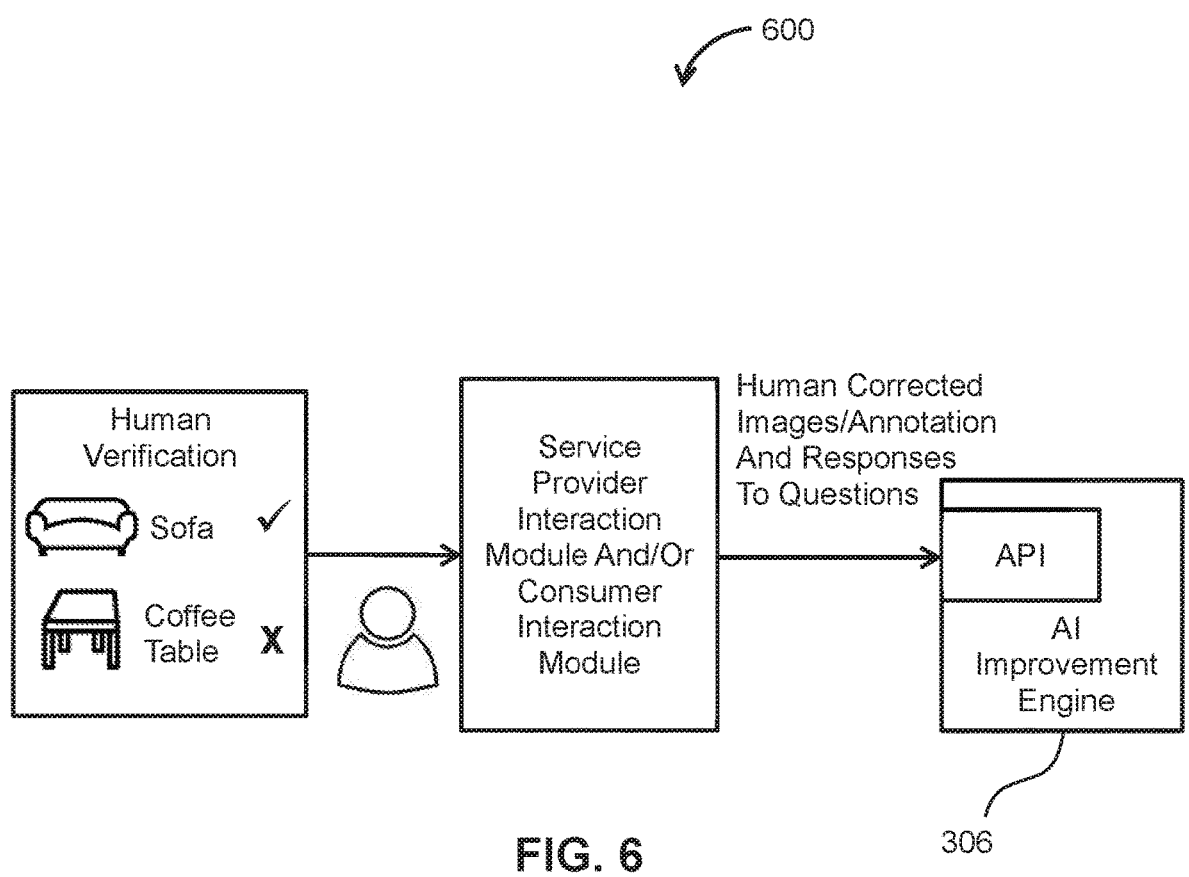
FIG. 6 illustrates an exemplary system where the output of the AI improvement engine is optionally human-verified and fed back into the AI improvement engine for better performance, in accordance with one or more implementations.

FIG. 6 shows a system 600 and how the inventory may be optionally human verified, in accordance with one or more implementations. During a human verification step, any mistakes by the detection algorithm may be corrected and/or the training framework may be updated with the updated images for training. The human verification may happen on end consumer devices where the user may correct the misdetections or in the cloud where a different human operator or service provider may issue the corrections. The output may be an updated inventory. The inventory may additionally contain size or weight information for the objects that are detected. The corrections may be sent back to the AI algorithm for further processing.

Figure 7:
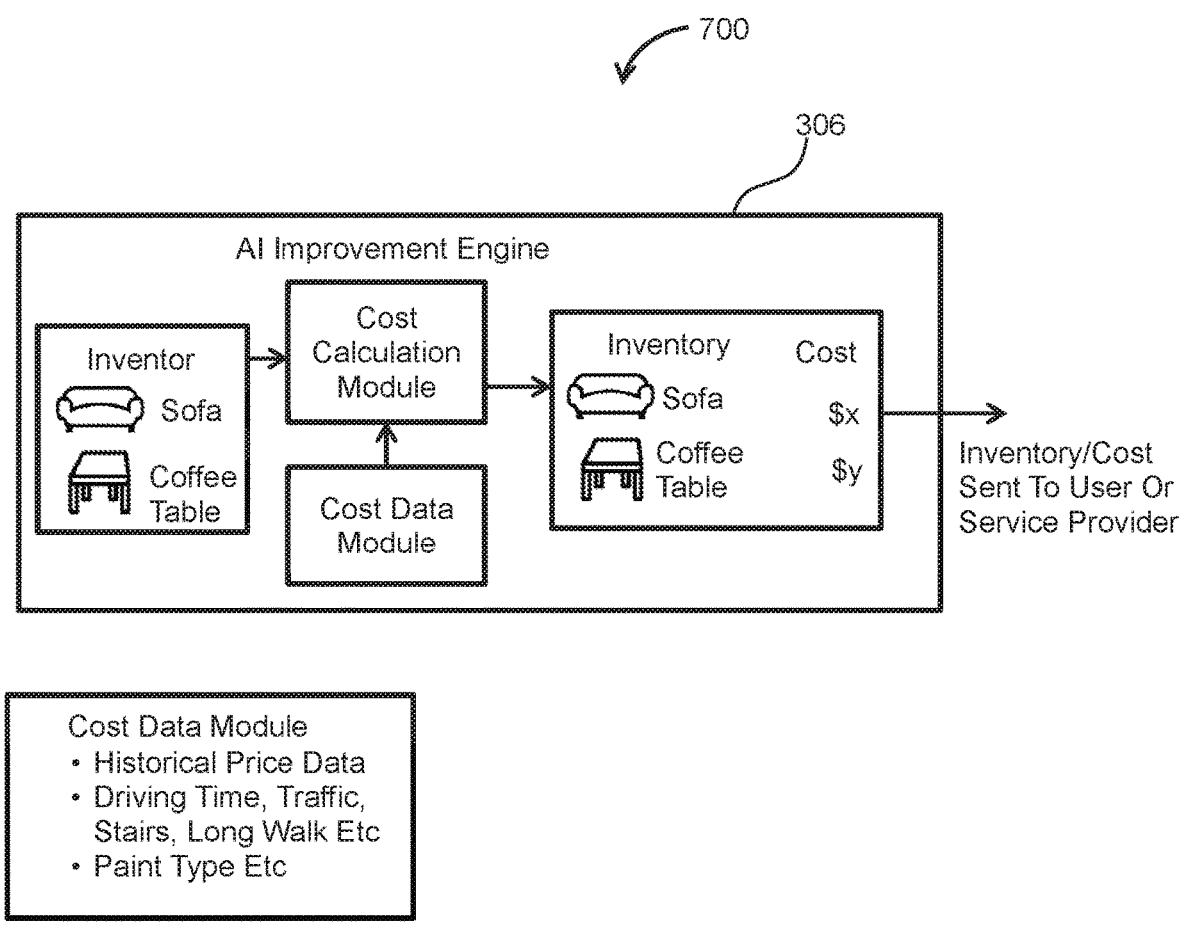
FIG. 7 illustrates an exemplary system for cost creation, in accordance with one or more implementations.

FIG. 7 illustrates an exemplary system 700 for cost creation. The inventory information may be fused with other cost data to generate cost per item for a specific service (e.g., moving, insurance, painting, and/or other services).

Figure 8:
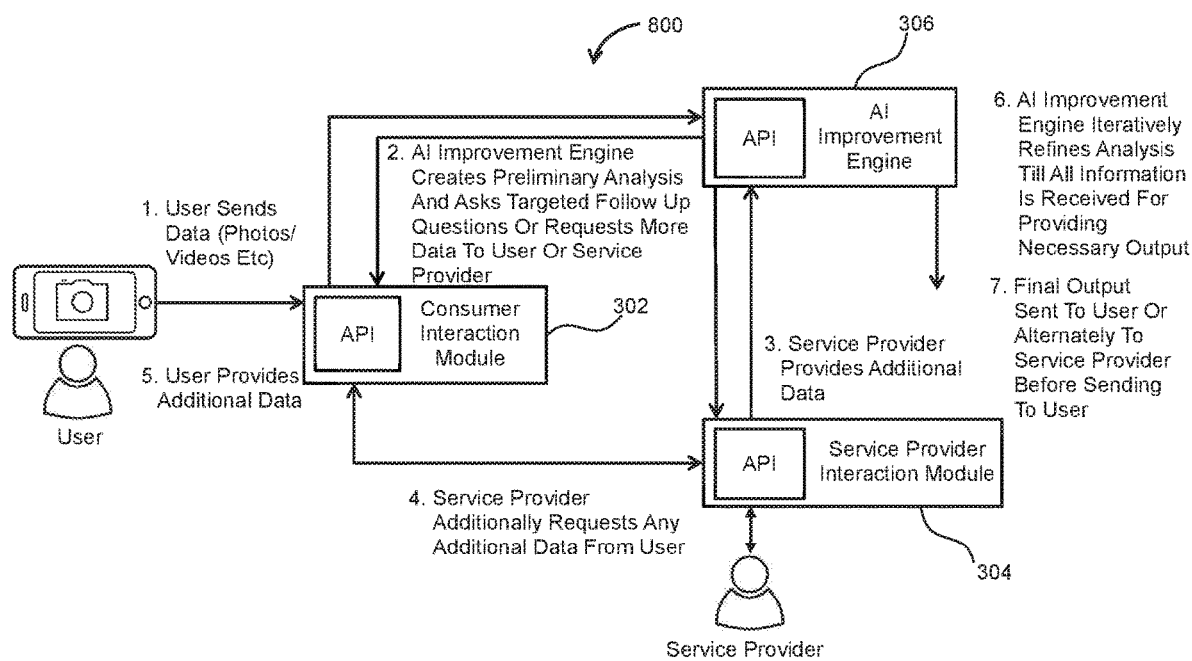
FIG. 8 illustrates an iterative way the user collects data, the AI improvement engine analyzes the data and asks relevant questions of either the service provider or user, in accordance with one or more implementations.

FIG. 8 illustrates a flow diagram 800 of an iterative way that AI and/or a human agent may ask relevant questions based on data (text, image, videos, etc.) sent by the user so far to collect additional information needed to generate the quote.

Figure 9:
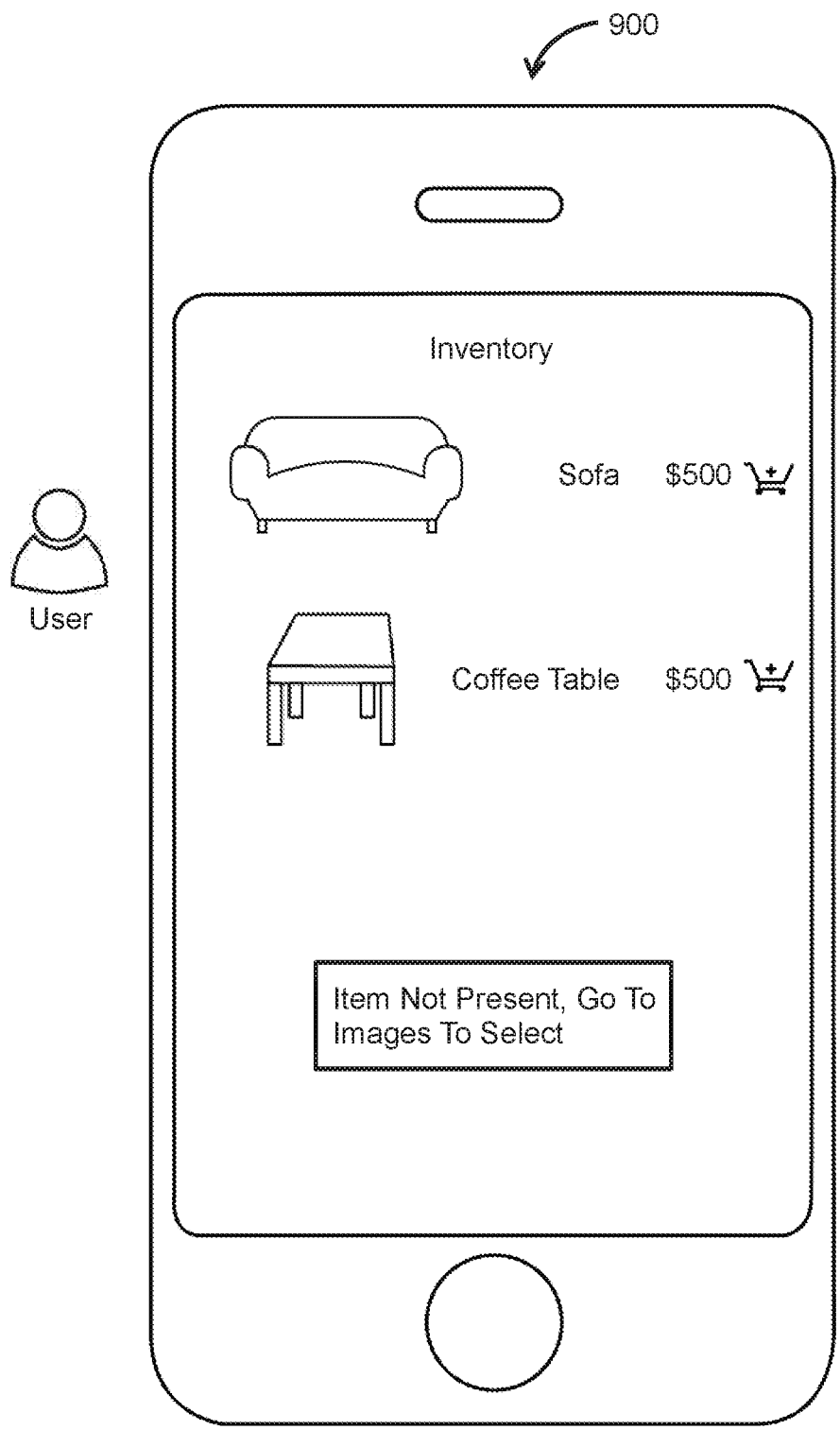
FIG. 9 illustrates user additions to cart, in accordance with one or more implementations.

FIG. 9 illustrates a device 900 showing user additions to a cart, in accordance with one or more implementations. The inventory and/or cost may be shown to the user. The user may add the needed items to cart (e.g., items needed to move, walls needed to be painted, and/or other items). The user may be given a choice of items that may be missing. The user may go back to original image and draw a simple bounding box to highlight items which will are to be added back to the cart.

Figure 10:
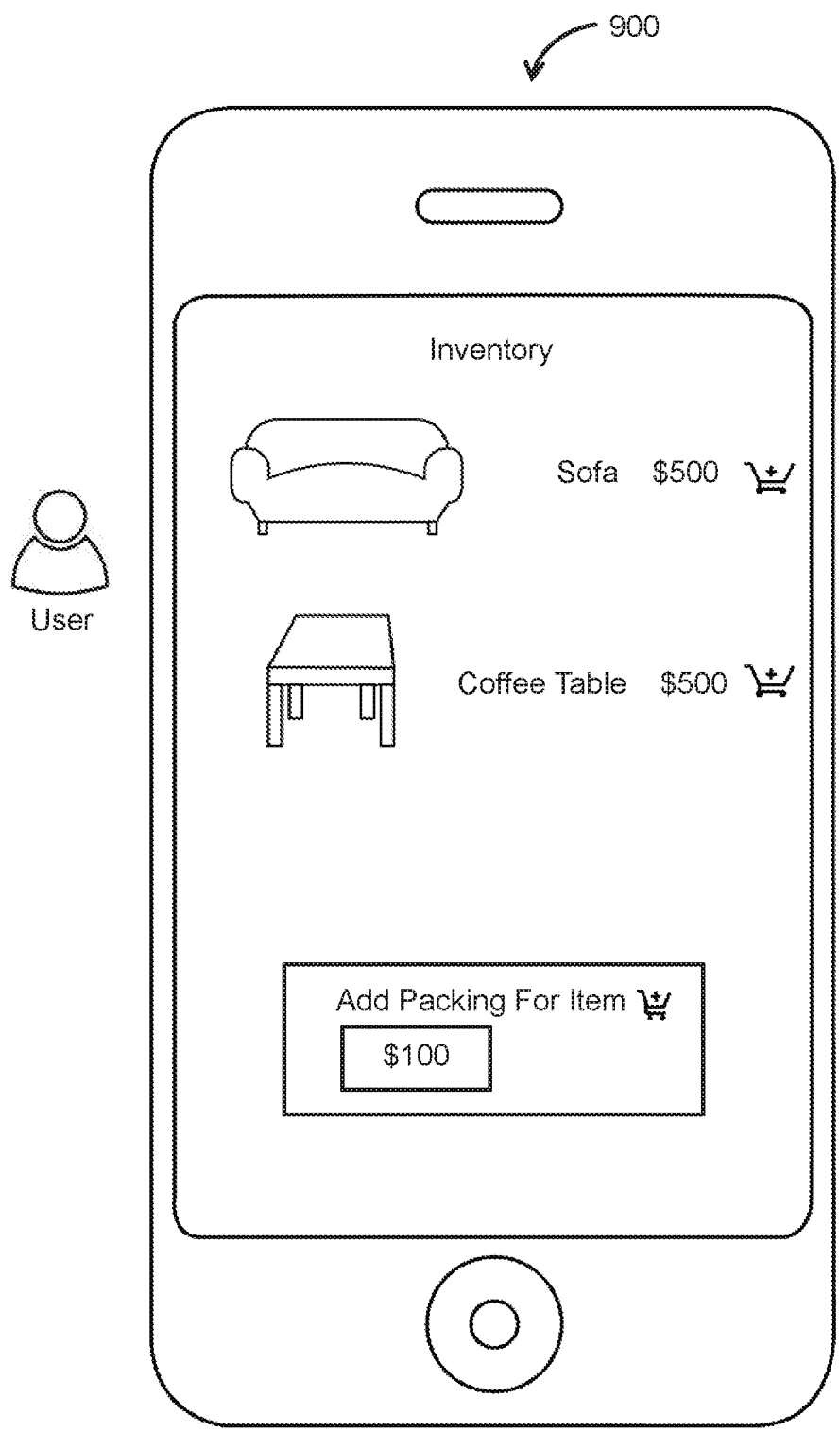
FIG. 10 illustrates additional services, in accordance with one or more implementations.

FIG. 10 illustrates the device 900 showing additional services, in accordance with one or more implementations. When a user adds an item to the cart, auxiliary services may pop up (e.g., a prompt to package the item and/or cost where the cost is dependent on the item, detection algorithm, premium quality paint, multiple coats needed, and/or other services).

Figure 11:
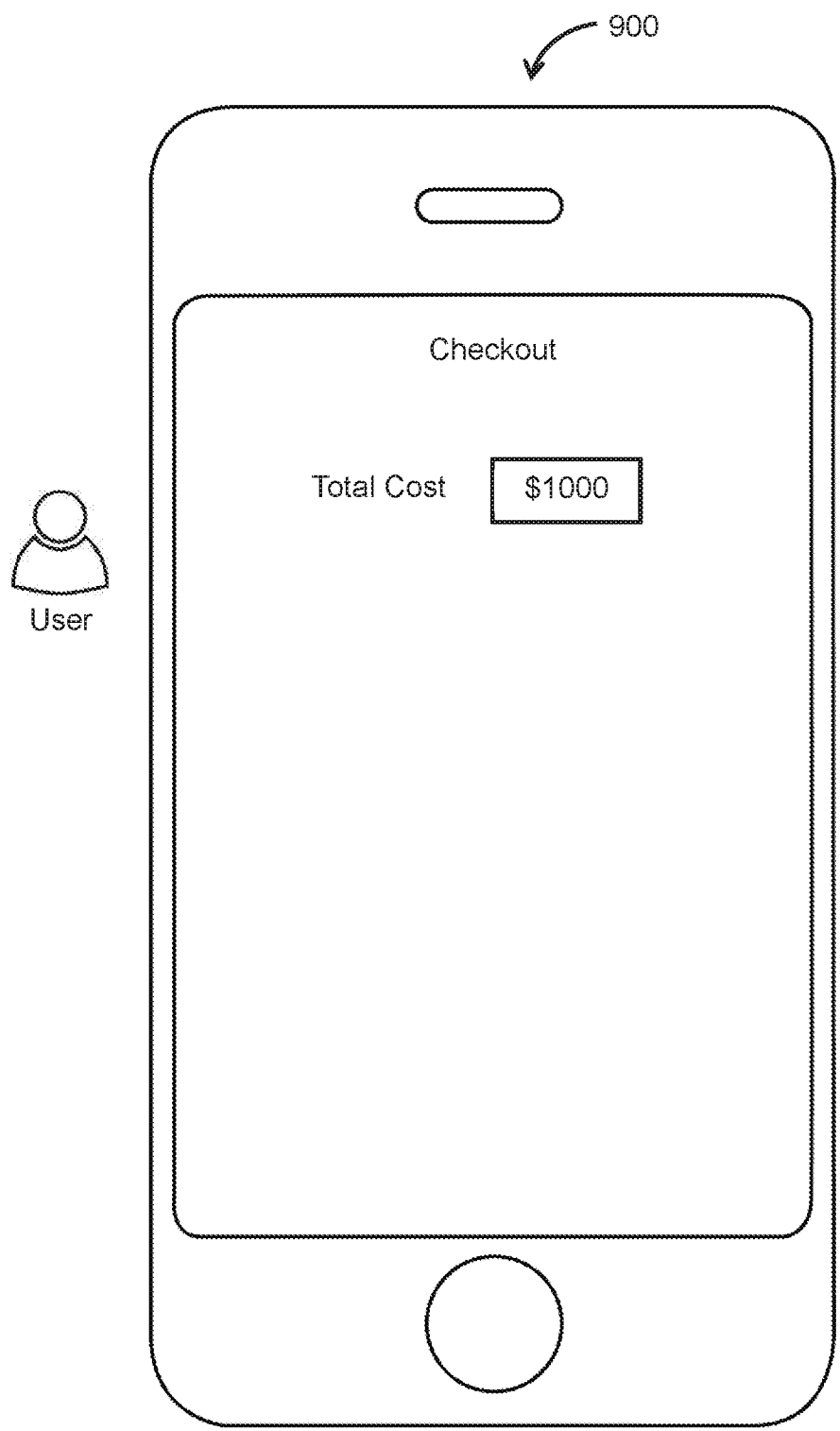
FIG. 11 illustrates a completed transaction, in accordance with one or more implementations.

FIG. 11 illustrates the device 900 showing a completed transaction, in accordance with one or more implementations. The user may pay for the needed services in the app. The information may be transmitted to the service provider.

Figure 12:
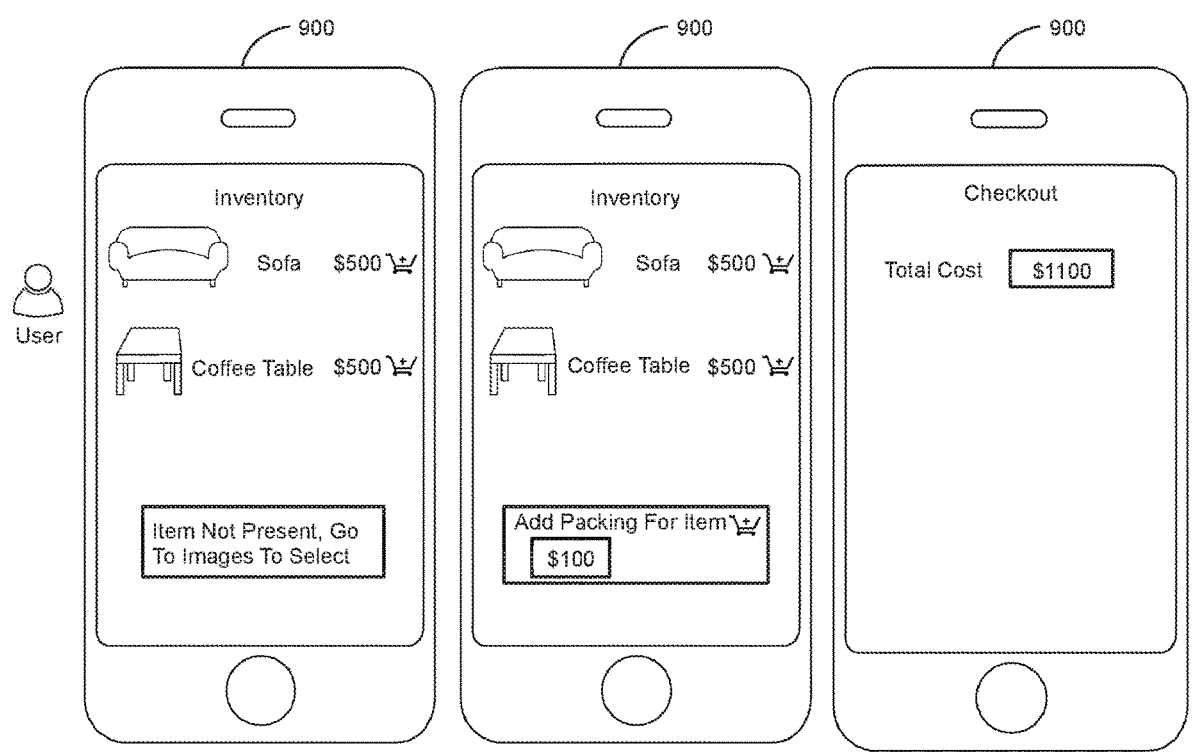
FIG. 12 illustrates providing AI-based cost estimates for services, in accordance with one or more implementations.

FIG. 12 illustrates providing AI-based cost estimates for services, in accordance with one or more implementations.

Figure 13:
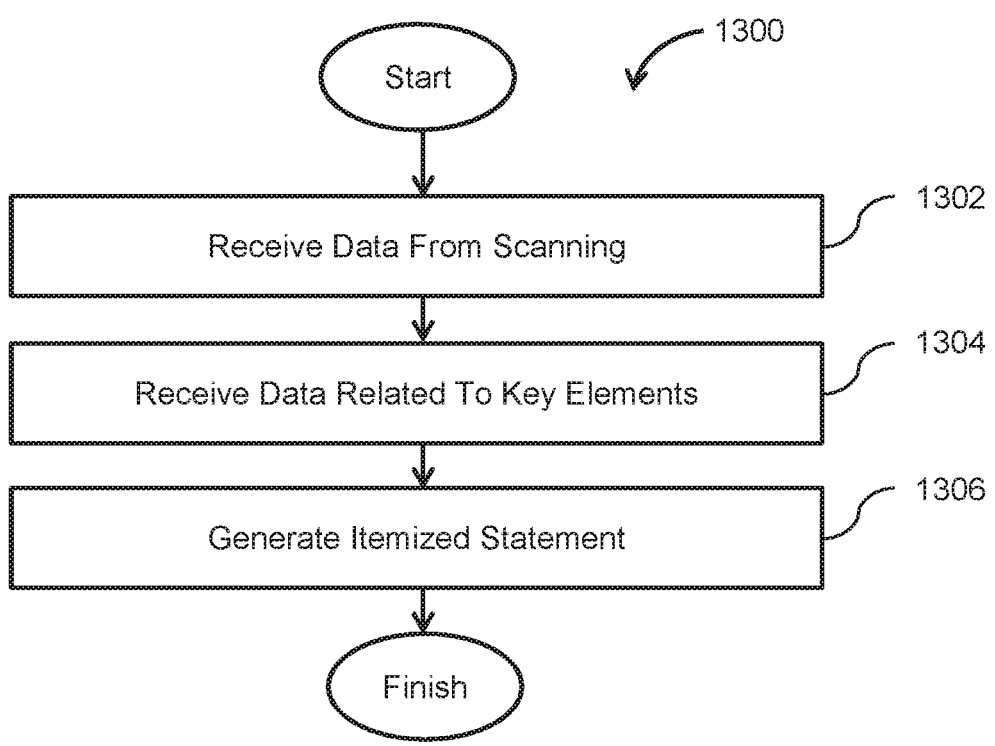
FIG. 13 illustrates a method for providing AI-based cost estimates for services, in accordance with one or more implementations.

FIG. 13 illustrates a method 1300 for providing AI-based cost estimates for services, in accordance with one or more implementations. The operations of method 1300 presented below are intended to be illustrative. In some implementations, method 1300 may be accomplished with one or more additional operations not described, and/or without one or more of the operations discussed. Additionally, the order in which the operations of method 1300 are illustrated in FIG. 13 and described below is not intended to be limiting.

In some implementations, method 1300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 1302, data from a scanning of a location may be received, at one or more hardware processors. The scanning performed by one or more of a camera, a computer vision device, an inertial measurement unit, or a depth sensor. Operation 1302 may be performed by one or more hardware processors configured to execute a machine-readable instruction component that is the same as or similar to receiving scanned data component 108 (as described in connection with FIG. 1), in accordance with one or more implementations.

At an operation 1304, data may be received, at one or more hardware processors, related to the identification of one or more key elements at the location. Operation 1304 may be performed by one or more hardware processors configured to execute a machine-readable instruction component that is the same as or similar to receiving key element data component 110 (as described in connection with FIG. 1), in accordance with one or more implementations.

At an operation 1306, an itemized statement and quote of work to be performed may be generated at one or more processors. Operation 1306 may be performed by one or more hardware processors configured to execute a machine-readable instruction component that is the same as or similar to generate statement component 112 (as described in connection with FIG. 1), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An interactive property and renter's insurance quotation system comprising one or more hardware processors configured by machine-readable instructions to:
    train an electronic artificial intelligence model using training data from a scanning of a training location, to identify a subset of training objects at the training location comprising one or more training elements at the location that a trainer indicates contribute to a property and/or renter's itemized insurance training inventory list, and a condition of the one or more identified training elements;
    receive data from a scanning of a user location through an application running on a computing device, or in a web browser on the computing device, the computing device associated with a user such that the data is received from the user, the data comprising information related to one or more two dimensional images of the user location, text entered or selected by the user via the computing device, screen taps, drawings of bounding boxes in one or more two dimensional images, and/or audio information recorded by the user via the computing device, the two dimensional images, text, screen taps, drawings of bounding boxes, and/or audio information describing (1) furniture, (2) appliances, (3) stored items in cabinets, (4) delicate items, (5) valuable items, and/or (6) surfaces including walls, ceilings, doors, windows and roofs at the user location; and (7) user preferences;
    identify, using the trained artificial intelligence model, based on the one or more two dimensional images, the text, screen taps, drawings of bounding boxes, and/or the audio information,
        (A) a subset of user objects at the user location comprising one or more key elements at the user location that the user intends to insure, the one or more key elements comprising (1) one or more individual pieces of the furniture, (2) one or more individual appliances, (3) some or all of the stored items in cabinets, (4) a delicate item, (5) one or more valuable items, and/or (6) one or more of the surfaces, and
        (B) a condition of the one or more identified key elements at the user location that the user intends to insure;
    cause, using the artificial intelligence model, presentation of an interactive user interface displaying a preliminary itemized property and/or renter's insurance inventory list to the user via the computing device associated with the user and to an insurance services provider via a computing device associated with the insurance services provider, wherein:
        the preliminary itemized property and/or renter's insurance inventory list comprises representations of the one or more key elements at the user location that the user intends to insure,
        the interface comprises an editable interface that receives corrections, additions and/or deletions by the user and the insurance services provider, and
        the same or different summary views of the interface are presented via the application or web browser running on the computing device associated with the user and the computing device associated with the insurance services provider,
    cause, using the artificial intelligence model, targeted questions to be asked to the user via the computing device associated with the user and/or to the insurance services provider via the computing device associated with the insurance services provider, the targeted questions determined by the artificial intelligence model based on the data from the scanning of the user location and the one or more key elements, the targeted questions configured to clarify which key elements the user intends to insure and the condition of the key elements the user intends to insure, the targeted questions comprising one or more unique questions associated with insuring one or more of the key elements the user intends to insure;
    determine, with the artificial intelligence model, a finalized itemized property and/or renter's insurance inventory list of one or more key elements at the user location the user intends to insure, based answers to the targeted questions, the finalized itemized property and/or renter's insurance inventory list comprising the key elements the user intends to insure and their conditions, and services needed for insuring the key elements;
    cause presentation of the finalized itemized property and/or renter's insurance inventory list to the user via the application or web browser on the computing device associated with the user;
    receive, via the application or web browser on the computing device associated with the user, user-adjustments to the finalized itemized property and/or renter's insurance inventory list, the adjustments comprising changes to one or both of the key elements the user intends to insure and the services needed for insuring the key elements,
        wherein the computing device associated with the user and the computing device associated with the insurance services provider are both in communication with the one or more processors such that changes or updates made via either computing device are reflected to each other; and
    communicate an adjusted itemized property and/or renter's insurance inventory list to the insurance services provider.

2. The system of claim 1, wherein the condition of the key elements the user intends to insure comprises information related to one or more of a brand, a value, or an age of an individual key element.

3. The system of claim 1, wherein the one or more processors are further configured to:
    store the data from the scanning of the location; and
    responsive to an insurance claim associated with the user, automatically verify the insurance claim based on the stored data.

4. The system of claim 3, wherein verification comprises a comparison of items in the insurance claim to the key elements.

5. The system of claim 1, wherein some or all of the one or more processors are located in the computing device associated with the user.

6. The system of claim 1, wherein some or all of the one or more processors are located remotely from the computing device associated with the user.

7. The system of claim 1, wherein a screen tap is configured to indicate a key element the user intends to insure.

8. The system of claim 1, wherein the representations of the one or more key elements comprise images of the key elements, thumbnails of the key elements, text describing the key elements, and/or icons associated with the key elements.

9. The system of claim 1, wherein the targeted questions comprise individual questions that request a specific answer, and/or open ended requests for additional information related to the key elements.

10. The system of claim 1, wherein the trained artificial intelligence model comprises one or more of the one or more processors located on a deployment server.

11. The system of claim 1, wherein the trained artificial intelligence model comprises a consumer interaction module, a service provider interaction module, an artificial intelligence improvement engine, and a database, wherein:

the consumer interaction module is configured to ingest data from a consumer, store the ingested data in the database, and analyze the ingested data based on the training;

the service provider interaction module is configured to form the editable interface to allow the insurance services provider to review information from the user and the consumer interaction module, make corrections if needed, and communicate with the user; and the artificial intelligence improvement engine is configured to combine output from the consumer interaction module with any changes made by the user and/or the insurance services provider, and provide feedback for re-training the artificial intelligence model to improve predictions made by the artificial intelligence model.

\* \* \* \* \*